(12) United States Patent
Schwalm et al.

(10) Patent No.: US 9,193,888 B2
(45) Date of Patent: Nov. 24, 2015

(54) RADIATION-CURABLE AQUEOUS DISPERSIONS

(71) Applicant: BASF SE, Ludwigshafen (DE)

(72) Inventors: Reinhold Schwalm, Wachenheim (DE);
Peter Enenkel, Hessheim (DE);
Susanne Neumann, Speyer (DE); Klaus Menzel, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 244 days.

(21) Appl. No.: 13/800,285

(22) Filed: Mar. 13, 2013

(65) Prior Publication Data

US 2013/0245196 A1 Sep. 19, 2013

Related U.S. Application Data

(60) Provisional application No. 61/612,438, filed on Mar. 19, 2012.

(51) Int. Cl.
| | | |
|---|---|---|
| *C09D 175/04* | (2006.01) | |
| *C08G 18/75* | (2006.01) | |
| *C08G 18/08* | (2006.01) | |
| *C09D 175/16* | (2006.01) | |
| *C08G 18/38* | (2006.01) | |

(52) U.S. Cl.
CPC .......... *C09D 175/04* (2013.01); *C08G 18/0823* (2013.01); *C08G 18/3876* (2013.01); *C08G 18/755* (2013.01); *C09D 175/16* (2013.01)

(58) Field of Classification Search
CPC .......... C08G 18/0823; C08G 18/3876; C08G 18/755; C09D 175/04; C09D 175/16
USPC .................................................. 524/501, 591
See application file for complete search history.

(56) References Cited

U.S. PATENT DOCUMENTS

| | | | |
|---|---|---|---|
| 4,596,678 A | 6/1986 | Merger et al. | |
| 4,596,679 A | 6/1986 | Hellbach et al. | |
| 5,087,739 A | 2/1992 | Bohmholdt et al. | |
| 5,459,173 A | 10/1995 | Glaser et al. | |
| 5,840,823 A * | 11/1998 | Licht et al. | 528/73 |
| 6,551,710 B1 | 4/2003 | Chen et al. | |

FOREIGN PATENT DOCUMENTS

| | | |
|---|---|---|
| DE | 40 10 783 A1 | 10/1991 |
| DE | 41 13 160 A1 | 10/1992 |
| DE | 196 18 720 A1 | 11/1996 |
| DE | 197 24 199 A1 | 12/1998 |
| DE | 198 26 712 A1 | 12/1999 |
| DE | 199 13 353 A1 | 9/2000 |
| DE | 199 57 900 A1 | 6/2001 |
| DE | 100 13 186 A1 | 9/2001 |
| DE | 100 13 187 A1 | 10/2001 |
| EP | 0 007 508 A2 | 2/1980 |
| EP | 0 057 474 A2 | 8/1982 |
| EP | 0 126 299 A1 | 11/1984 |
| EP | 0 126 300 A1 | 11/1984 |
| EP | 0 355 443 A2 | 2/1990 |
| EP | 0 495 751 A1 | 7/1992 |
| EP | 0 548 669 A2 | 6/1993 |
| EP | 0 615 980 A2 | 9/1994 |
| EP | 0 794 204 A2 | 9/1997 |
| EP | 1 275 668 A1 | 1/2003 |
| EP | 1 703 255 A2 | 9/2006 |
| EP | 2 546 300 A1 | 1/2013 |
| WO | WO 98/33761 A1 | 8/1998 |
| WO | WO 00/39183 A1 | 7/2000 |

OTHER PUBLICATIONS

International Search Report issued Jul. 25, 2013 with English Translation of Category of Cited Documents.
Allison K. O'Brien, et al., "Oxygen Inhibition in Thiol-Acrylate Photopolymerizations", Journal of Polymer Science: Part A: Polymer Chemistry, vol. 44, 2006, pp. 2007-2014.

* cited by examiner

*Primary Examiner* — Ling Choi
*Assistant Examiner* — Chun-Cheng Wang
(74) *Attorney, Agent, or Firm* — Oblon, McClelland, Maier & Neustadt, L.L.P.

(57) ABSTRACT

The invention relates to radiation-curable aqueous dispersions having mercapto groups, to processes for preparing them, and to their use.

14 Claims, No Drawings

RADIATION-CURABLE AQUEOUS DISPERSIONS

CROSS-REFERENCE TO RELATED APPLICATIONS

This application claims the benefit of priority to U.S. Provisional Application No. 61/612,438 filed on Mar. 19, 2012.

The invention relates to radiation-curable aqueous dispersions having mercapto groups, to processes for preparing them, and to their use.

U.S. Pat. No. 6,551,710 B1 discloses reacting radiation-curable acrylates with compounds containing thio groups.

Disadvantages of these systems are that the coating compositions are applied from solvent and thus have a high VOC content, and that the mixtures of UV-curable compound and dithiol and polythiol component are mixed with one another for immediate reaction and thus possess no shelf life.

Reactive mixtures of acrylates and thiol compounds are also known from EP 1275668. There again, the mixtures are prepared for immediate reaction, with no provision for storage and shelf life.

In "Oxygen inhibition in thiol-acrylate photopolymerrizations", J. Polym. Sci., Part A: Polymer Chemistry 44: 2007-2014 (2006), A. K. O'Brian, N. B. Cramer, and C. N. Bowman describe the effect of the presence of oxygen ($O_2$) on the copolymerization of acrylates with thiols in bulk. For a given concentration of thiol functionalities, thiols of higher functionality lead to more rapid polymerization, making stabilization even more difficult.

To lessen a reaction between thiol compounds and systems containing double bonds it is necessary, in accordance with the teaching of U.S. Pat. No. 5,459,173, to stabilize the systems.

It was an object of the present invention to provide water-dispersible, radiation-curable compounds which can be cured by radiation and by reaction with mercapto groups. The dispersions are to be stable on storage and to be preparable from simple synthesis components, and the coatings obtained with them are to have high hardness.

This object has been achieved by means of aqueous dispersions comprising at least one water-dispersible, radiation-curable polyurethane (A) comprising as synthesis components (Aa) at least one organic aliphatic, aromatic, or cycloaliphatic diisocyanate or polyisocyanate,
(Ab) at least one compound (Ab) having at least one isocyanate-reactive group and at least one free-radically polymerizable unsaturated group,
(Ac) optionally at least one compound having at least two isocyanate-reactive groups,
(Ae) optionally at least one compound having precisely one isocyanate-reactive group,
(Ag) at least one compound having at least one isocyanate-reactive group and at least one dispersive group,
and also
at least one water-dispersible compound (B) which has at least two mercapto groups.

Water-Dispersible, Radiation-Curable Polyurethanes (A)

The reaction mixtures obtained when preparing the polyurethanes of the invention generally have a number-average molar weight $M_n$ of less than 10 000 g/mol, preferably of less than 5000 g/mol, more preferably of less than 4000, and very preferably of less than 2000 g/mol (determined by gel permeation chromatography with tetrahydrofuran, using polystyrene as standard).

Component (Aa) may comprise monomers or oligomers of aliphatic or cycloaliphatic diisocyanates.

The NCO functionality of such a compound is generally at least 1.8 and may be up to 8, preferably 1.8 to 5, and more preferably 2 to 4.

The amount of isocyanate groups, calculated as NCO=42 g/mol, is generally 5% to 25% by weight.

The diisocyanates are preferably isocyanates having 4 to 20 C atoms. Examples of typical diisocyanates are aliphatic diisocyanates such as tetramethylene diisocyanate, pentamethylene 1,5-diisocyanate, hexamethylene diisocyanate (1,6-diisocyanatohexane), octamethylene diisocyanate, decamethylene diisocyanate, dodecamethylene diisocyanate, tetradecamethylene diisocyanate, derivatives of lysine diisocyanate, trimethylhexane diisocyanate or tetramethylhexane diisocyanate, cycloaliphatic diisocyanates such as 1,4-, 1,3- or 1,2-diisocyanatocyclohexane, 4,4'- or 2,4'-di(isocyanatocyclohexyl)methane, 1-isocyanato-3,3,5-trimethyl-5-(isocyanatomethyl)cyclohexane (isophorone diisocyanate), 1,3- or 1,4-bis(isocyanatomethyl)cyclohexane or 2,4-, or 2,6-diisocyanato-1-methylcyclohexane, and also 3 (or 4), 8 (or 9)-bis(isocyanatomethyl)tricyclo[$5.2.1.0^{2,6}$]decane isomer mixtures Mixtures of said diisocyanates may also be present.

Particular preference is given to hexamethylene diisocyanate, 1,3-bis(isocyanatomethyl)-cyclohexane, isophorone diisocyanate, and 4,4'- or 2,4'-di(isocyanatocyclohexyl)methane, very particular preference to isophorone diisocyanate and hexamethylene diisocyanate, and especial preference to hexamethylene diisocyanate.

Isophorone diisocyanate is usually in the form of a mixture, specifically a mixture of the cis and trans isomers, generally in a ratio of about 60:40 to 80:20 (w/w), preferably in a ratio of about 70:30 to 75:25, and more preferably in a ratio of approximately 75:25.

Dicyclohexylmethane 4,4'-diisocyanate may likewise be in the form of a mixture of the different cis and trans isomers.

Cycloaliphatic isocyanates are those which comprise at least one cycloaliphatic ring system.

Aliphatic isocyanates are those which comprise exclusively linear or branched chains, in other words acyclic compounds.

Also contemplated are higher isocyanates, having on average more than 2 isocyanate groups. Suitable examples include triisocyanates such as triisocyanatononane or 2,4,6-triisocyanato-toluene.

Suitable polyisocyanates include polyisocyanates containing isocyanurate groups, uretdione, diisocyanates, polyisocyanates containing biuret groups, polyisocyanates containing urethane groups or allophanate groups, polyisocyanates comprising oxadiazinetrione groups, uretonimine-modified polyisocyanates, carbodiimide, hyperbranched polyisocyanates, polyurethane-polyisocyanate prepolymers or polyurea-polyisocyanate prepolymers of linear or branched $C_4$-$C_{20}$ alkylene diisocyanates, cycloaliphatic diisocyanates having a total of 6 to 20 C atoms, or mixtures thereof.

The di- and polyisocyanates which can be used preferably have an isocyanate group (calculated as NCO, molecular weight=42) content of 10% to 60% by weight, based on the di- and polyisocyanate (mixture), preferably 15% to 60% by weight, and more preferably 20% to 55% by weight.

Preference is given to aliphatic and/or cycloaliphatic di- and polyisocyanates, qualified collectively as (cyclo)aliphatic for the purposes of this specification, examples being the aliphatic and/or cycloaliphatic diisocyanates stated above, or mixtures thereof.

For the present invention it is possible to use not only those di- and polyisocyanates obtained by phosgenating the corresponding amines but also those prepared without the use of phosgene, i.e., by phosgene-free processes. According to EP-A-0 126 299 (U.S. Pat. No. 4,596,678), EP-A-126 300 (U.S. Pat. No. 4,596,679), and EP-A-355 443 (U.S. Pat. No. 5,087, 739), for example, (cyclo)aliphatic diisocyanates, such as hexamethylene 1,6-diisocyanate (HDI), isomeric aliphatic diisocyanates having 6 carbon atoms in the alkylene radical, 4,4'- or 2,4'-di(isocyanatocyclohexyl)methane, and 1-isocyanato-3-isocyanatomethyl-3,5,5-trimethylcyclohexane (isophorone diisocyanate or IPDI), for example, can be prepared by reacting the (cyclo)aliphatic diamines with, for example, urea and alcohols to give (cyclo)aliphatic biscarbamic esters and subjecting said esters to thermal cleavage into the corresponding diisocyanates and alcohols. The synthesis takes place usually continuously in a circulation process and in the presence, optionally, of N-unsubstituted carbamic esters, dialkyl carbonates, and other by-products recycled from the reaction process.

Di- or polyisocyanates obtained in this way generally contain a very low or even unmeasurable fraction of chlorinated compounds, leading to favorable color numbers in the products.

In one embodiment of the present invention the di- and polyisocyanates (Aa) have a total hydrolyzable chlorine content of less than 200 ppm, preferably of less than 120 ppm, more preferably less than 80 ppm, very preferably less than 50 ppm, in particular less than 15 ppm, and especially less than 10 ppm. This can be measured by means, for example, of ASTM specification D4663-98. Of course, though, di- and polyisocyanates (Aa) having a higher chlorine content can also be used.

The di- and polyisocyanates (Aa) may also be at least partly in blocked form.

Preference extends to

1) Polyisocyanates containing isocyanurate groups and derived from aliphatic and/or cycloaliphatic diisocyanates. Particular preference is given in this context to the corresponding aliphatic and/or cycloaliphatic isocyanatoisocyanurates and in particular to those based on hexamethylene diisocyanate and isophorone diisocyanate. The isocyanurates present are, in particular, tris-isocyanatoalkyl and/or tris-isocyanatocycloalkyl isocyanurates, which constitute cyclic trimers of the diisocyanates, or are mixtures with their higher homologs containing more than one isocyanurate ring. The isocyanatoisocyanurates generally have an NCO content of 10% to 30% by weight, in particular 15% to 25% by weight, and an average NCO functionality of 2.6 to 8.

2) Uretdione diisocyanates with aliphatically and/or cycloaliphatically attached isocyanate groups, preferably aliphatically and/or cycloaliphatically attached, and in particular those derived from hexamethylene diisocyanate or isophorone diisocyanate. Uretdione diisocyanates are cyclic dimerization products of diisocyanates.

The uretdione diisocyanates can be used as a sole component or in a mixture with other polyisocyanates, particularly those specified under 1).

3) Polyisocyanates containing biuret groups and having cycloaliphatically or aliphatically attached, preferably cycloaliphatically or aliphatically attached, isocyanate groups, especially tris(6-isocyanatohexyl)biuret or its mixtures with its higher homologs. These polyisocyanates containing biuret groups generally have an NCO content of 18% to 22% by weight and an average NCO functionality of 2.8 to 4.5.

4) Polyisocyanates containing urethane and/or allophanate groups and having aliphatically or cycloaliphatically attached, preferably aliphatically or cycloaliphatically attached, isocyanate groups, such as may be obtained, for example, by reacting excess amounts of hexamethylene diisocyanate or of isophorone diisocyanate with mono- or polyhydric alcohols such as, for example, methanol, ethanol, isopropanol, n-propanol, n-butanol, isobutanol, sec-butanol, tert-butanol, n-hexanol, n-heptanol, n-octanol, n-decanol, n-dodecanol (lauryl alcohol), 2-ethylhexanol, n-pentanol, stearyl alcohol, cetyl alcohol, lauryl alcohol, ethylene glycol monomethyl ether, ethylene glycol monoethyl ether, 1,3-propanediol monomethyl ether, cyclopentanol, cyclohexanol, cyclooctanol, cyclododecanol, trimethylolpropane, neopentyl glycol, pentaerythritol, 1,4-butanediol, 1,6-hexanediol, 1,3-propanediol, 2-ethyl-1,3-propanediol, 2-methyl-1,3-propanediol, ethylene glycol, diethylene glycol, triethylene glycol, tetraethylene glycol, pentaethylene glycol, glycerol, 1,2-dihydroxypropane, 2,2-dimethyl-1,2-ethanediol, 1,2-butanediol, 1,4-butanediol, 3-methylpentane-1,5-diol, 2-ethylhexane-1,3-diol, 2,4-diethyloctane-1,3-diol, hydroxypivalic acid neopentyl glycol ester, ditrimethylolpropane, dipentaerythritol, 2,2-bis(4-hydroxycyclohexyl)propane, 1,1-, 1,2-, 1,3-, and 1,4-cyclohexanedimethanol, 1,2-, 1,3- or 1,4-cyclohexanediol or mixtures thereof. These polyisocyanates containing urethane and/or allophanate groups generally have an NCO content of 12% to 20% by weight and an average NCO functionality of 2.5 to 4.5.

5) Polyisocyanates comprising oxadiazinetrione groups, derived preferably from hexamethylene diisocyanate or isophorone diisocyanate. Polyisocyanates of this kind comprising oxadiazinetrione groups are accessible from diisocyanate and carbon dioxide.

6) Polyisocyanates comprising iminooxadiazinedione groups, derived preferably from hexamethylene diisocyanate or isophorone diisocyanate. Polyisocyanates of this kind comprising iminooxadiazinedione groups are preparable from diisocyanates by means of specific catalysts.

7) Uretonimine-modified polyisocyanates.

8) Carbodiimide-modified polyisocyanates.

9) Hyperbranched polyisocyanates, of the kind known for example from DE-A1 10013186 or DE-A1 10013187.

10) Polyurethane-polyisocyanate prepolymers, from di- and/or polyisocyanates with alcohols.

11) Polyurea-polyisocyanate prepolymers.

Polyisocyanates 1) to 11) may be used in a mixture, including optionally in a mixture with diisocyanates.

In one preferred embodiment of the present invention component (Aa) is a polyisocyanate and is selected from the group consisting of isocyanurates, biurets, urethanes, and allophanates, preferably from the group consisting of isocyanurates, urethanes, and allophanates, more preferably from the group consisting of isocyanurates and allophanates.

The fraction of other groups which form from isocyanate groups, especially of isocyanurate, biuret, uretdione, iminooxadiazinetrione and/or carbodiimide groups, is of minor significance in accordance with the invention.

In a further preferred embodiment component (Aa) comprises polyisocyanates containing isocyanurate groups. The isocyanato-isocyanurates generally have an NCO content of 10% to 30% by weight, in particular 15% to 25% by weight, and an average NCO functionality of 2.6 to 8.

In one preferred embodiment of the invention the polyurethanes (A) of the invention no longer have virtually any free isocyanate groups—in other words, the amount of free isocyanate groups is less than 0.5% by weight, preferably less than 0.3%, more preferably less than 0.2%, very preferably less than 0.1%, in particular less than 0.05%, and especially 0% by weight.

As a result of their preparation, polyisocyanates (Aa) may still have a small fraction of their parent monomeric diisocyanate, this fraction being up to 5% by weight for example, more preferably up to 3% by weight, very preferably up to 2%, in particular up to 1%, especially up to 0.5%, and even up to 0.25% by weight.

Compounds suitable as component (Ab) include, in accordance with the invention, compounds which carry at least one isocyanate-reactive group and at least one free-radically polymerizable group.

In one preferred embodiment of the invention the compound (Ab) is made up of compounds having precisely one isocyanate-reactive group. The number of free-radically polymerizable unsaturated groups is at least one, preferably one to five, more preferably one to four, and very preferably one to three free-radically polymerizable unsaturated groups.

The components (Ab) preferably have a molar weight below 10 000 g/mol, more preferably below 5000 g/mol, very preferably below 4000 g/mol, and in particular below 3000 g/mol. Specific compounds (Ab) have a molar weight below 1000 or even below 600 g/mol.

Examples of possible isocyanate-reactive groups include —OH, —SH, —NH$_2$, and —NHR$^5$, R$^5$ being hydrogen or an alkyl group comprising 1 to 4 carbon atoms, such as methyl, ethyl, n-propyl, isopropyl, n-butyl, isobutyl, sec-butyl or tert-butyl, for example.

Isocyanate-reactive groups can with preference be —OH, —NH$_2$ or —NHR$^5$, more preferably —OH or —NH$_2$, and very preferably —OH.

Examples of possible components (Ab) include monoesters of α,β-unsaturated carboxylic acids, such as acrylic acid, methacrylic acid, crotonic acid, itaconic acid, fumaric acid, maleic acid, acrylamidoglycolic acid, methacrylamidoglycolic acid or vinyl ethers with diols or polyols, having preferably 2 to 20 C atoms and at least two hydroxyl groups, such as ethylene glycol, diethylene glycol, triethylene glycol, 1,2-propylene glycol, 1,3-propylene glycol, 1,1-dimethyl-1,2-ethanediol, dipropylene glycol, triethylene glycol, tetraethylene glycol, pentaethylene glycol, tripropylene glycol, 1,2-, 1,3- or 1,4-butanediol, 1,5-pentanediol, neopentyl glycol, 1,6-hexanediol, 2-methyl-1,5-pentanediol, 2-ethyl-1,4-butanediol, 1,4-dimethylolcyclohexane, 2,2-bis(4-hydroxycyclohexyl)propane, glycerol, trimethylolethane, trimethylolpropane, trimethylolbutane, pentaerythritol, ditrimethylolpropane, erythritol, sorbitol, polyTHF having a molar weight between 162 and 2000, poly-1,3-propanediol having a molar weight between 134 and 400 or polyethylene glycol having a molar weight between 238 and 458. In addition it is also possible to use esters or amides of (meth)acrylic acid with amino alcohols, examples being 2-aminoethanol, 2-(methylamino)ethanol, 3-amino-1-propanol, 1-amino-2-propanol or 2-(2-aminoethoxy)ethanol, 2-mercaptoethanol or polyaminoalkanes, such as ethylenediamine or diethylenetriamine, or vinylacetic acid.

In addition, unsaturated polyetherols or polyesterols or polyacrylate polyols having an average OH functionality of 2 to 10 are also suitable, albeit less preferably.

Examples of amides of ethylenically unsaturated carboxylic acids with amino alcohols are hydroxyalkyl(meth)acrylamides such as N-hydroxymethylacrylamide, N-hydroxymethyl-methacrylamide, N-hydroxyethylacrylamide, N-hydroxyethylmethacrylamide, 5-hydroxy-3-oxapentyl (meth)acrylamide, N-hydroxyalkylcrotonamides such as N-hydroxymethylcrotonamide, or N-hydroxyalkylmaleimides such as N-hydroxyethylmaleimide.

Preference is given to using 2-hydroxyethyl(meth)acrylate, 2- or 3-hydroxypropyl(meth)acrylate, 1,4-butanediol mono(meth)acrylate, neopentyl glycol mono(meth)acrylate, 1,5-pentanediol mono(meth)acrylate, 1,6-hexanediol mono(meth)acrylate, glycerol mono(meth)acrylate and di(meth)acrylate, trimethylolpropane mono(meth)acrylate and di(meth)acrylate, pentaerythritol mono(meth)acrylate, di(meth)acrylate, and tri(meth)acrylate, and also 4-hydroxybutyl vinyl ether, 2-aminoethyl(meth)acrylate, 2-aminopropyl(meth)acrylate, 3-aminopropyl(meth)acrylate, 4-aminobutyl(meth)acrylate, 6-aminohexyl(meth)acrylate, 2-thioethyl(meth)acrylate, 2-aminoethyl(meth)acrylamide, 2-aminopropyl(meth)acrylamide, 3-aminopropyl(meth)acrylamide, 2-hydroxyethyl(meth)acrylamide, 2-hydroxypropyl(meth)acrylamide or 3-hydroxypropyl(meth)acrylamide. Particular preference is given to 2-hydroxyethyl acrylate, 2-hydroxyethyl methacrylate, 2- or 3-hydroxypropyl acrylate, 1,4-butanediol monoacrylate, 3-(acryloyloxy)-2-hydroxypropyl(meth)acrylate, and the monoacrylates of polyethylene glycol with a molar mass of 106 to 238.

Compounds suitable as component (Ac) are those which have at least two, preferably precisely two isocyanate-reactive groups, examples being —OH, —SH, —NH$_2$ or —NHR$^5$, in which R$^5$ independently at each occurrence can be hydrogen, methyl, ethyl, isopropyl, n-propyl, n-butyl, isobutyl, sec-butyl or tert-butyl.

Isocyanate-reactive groups can be preferably —OH, —NH$_2$ or —NHR$^5$, more preferably —OH or —NH$_2$, and very preferably —OH.

These are, preferably, diols containing 2 to 20 carbon atoms, examples being ethylene glycol, 1,2-propanediol, 1,3-propanediol, 1,1-dimethylethane-1,2-diol, 2-butyl-2-ethyl-1,3-propanediol, 2-ethyl-1,3-propanediol, 2-methyl-1,3-propanediol, neopentyl glycol, neopentyl glycol hydroxypivalate, 1,2-, 1,3- or 1,4-butanediol, 1,6-hexanediol, 1,10-decanediol, bis(4-hydroxycyclohexane)isopropylidene, tetramethylcyclobutanediol, 1,2-, 1,3- or 1,4-cyclohexanediol, cyclooctanediol, norbornanediol, pinanediol, decalindiol, 2-ethyl-1,3-hexanediol, 2,4-diethyloctane-1,3-diol, hydroquinone, bisphenol A, bisphenol F, bisphenol B, bisphenol S, 2,2-bis(4-hydroxycyclohexyl)propane, 1,1-, 1,2-, 1,3-, and 1,4-cyclohexanedimethanol, 1,2-, 1,3- or 1,4-cyclohexanediol, polyTHF with a molar mass between 162 and 2000, poly-1,2-propanediol or poly-1,3-propanediol with a molar mass between 134 and 1178 or polyethylene glycol with a molar mass between 106 and 2000, and aliphatic diamines, such as methylene-, and isopropylidene-bis(cyclohexylamine), piperazine, 1,2-, 1,3- or 1,4-diaminocyclohexane, 1,2-, 1,3- or 1,4-cyclohexane bis(methylamine), etc., dithiols or polyfunctional alcohols, secondary or primary amino alcohols, such as ethanolamine, monopropanolamine, etc., or thio alcohols, such as thioethylene glycol.

Polyester polyols are known for example from Ullmanns Encyklopädie der technischen Chemie, 4th edition, volume 19, pp. 62 to 65. Preference is given to using polyester polyols obtained by reacting dihydric alcohols with dibasic carboxylic acids. In lieu of the free polycarboxylic acids it is also possible to use the corresponding polycarboxylic anhydrides or corresponding polycarboxylic esters of lower alcohols or mixtures thereof to prepare the polyester polyols. The polycarboxylic acids may be aliphatic, cycloaliphatic, araliphatic, aromatic or heterocyclic and may optionally be substituted, by halogen atoms for example, and/or unsaturated. Examples thereof that may be mentioned include the following:

oxalic acid, maleic acid, fumaric acid, succinic acid, glutaric acid, adipic acid, sebacic acid, dodecanedioic acid, o-phthalic acid, isophthalic acid, terephthalic acid, trimellitic acid, azelaic acid, 1,4-cyclohexanedicarboxylic acid or tetrahydrophthalic acid, suberic acid, azelaic acid, phthalic anhydride, tetrahydrophthalic anhydride, hexahydrophthalic anhydride, tetrachlorophthalic anhydride, endomethylenetetrahydrophthalic anhydride, glutaric anhydride, maleic anhydride, dimeric fatty acids, their isomers and hydrogenation products, and also esterifiable derivatives, such as anhydrides or dialkyl esters, $C_1$-$C_4$-alkyl esters for example, preferably methyl, ethyl or n-butyl esters, of said acids are used. Preference is given to dicarboxylic acids of the general formula HOOC—$(CH_2)_y$—COOH, y being a number from 1 to 20, preferably an even number from 2 to 20; more preferably succinic acid, adipic acid, sebacic acid, and dodecanedicarboxylic acid.

Suitable polyhydric alcohols for preparing the polyesterols include 1,2-propanediol, ethylene glycol, 2,2-dimethyl-1,2-ethanediol, 1,3-propanediol, 1,2-butanediol, 1,3-butanediol, 1,4-butanediol, 3-methylpentane-1,5-diol, 2-ethylhexane-1, 3-diol, 2,4-diethyloctane-1,3-diol, 1,6-hexanediol, polyTHF having a molar mass between 162 and 2000, poly-1,3-propanediol having a molar mass between 134 and 1178, poly-1,2-propanediol having a molar mass between 134 and 898, polyethylene glycol having a molar mass between 106 and 458, neopentyl glycol, neopentyl glycol hydroxypivalate, 2-ethyl-1,3-propanediol, 2-methyl-1,3-propanediol, 2,2-bis (4-hydroxycyclohexyl)propane, 1,1-, 1,2-, 1,3-, and 1,4-cyclohexanedimethanol, 1,2-, 1,3- or 1,4-cyclohexanediol, trimethylolbutane, trimethylolpropane, trimethylolethane, neopentyl glycol, pentaerythritol, glycerol, ditrimethylolpropane, dipentaerythritol, sorbitol, mannitol, diglycerol, threitol, erythritol, adonitol (ribitol), arabitol (lyxitol), xylitol, dulcitol (galactitol), maltitol or isomalt, which optionally may have been alkoxylated as described above.

Preferred alcohols are those of the general formula HO—$(CH_2)_x$—OH, x being a number from 1 to 20, preferably an even number from 2 to 20. Preference is given to ethylene glycol, butane-1,4-diol, hexane-1,6-diol, octane-1,8-diol, and dodecane-1,12-diol. Preference is further given to neopentyl glycol.

Also suitable, furthermore, are polycarbonatediols, such as may be obtained, for example, by reacting phosgene with an excess of the low molecular weight alcohols specified as constituent components for the polyester polyols.

Also suitable are lactone-based polyesterdiols, which are homopolymers or copolymers of lactones, preferably hydroxyl-terminated adducts of lactones with suitable difunctional starter molecules. Suitable lactones include, preferably, those deriving from compounds of the general formula HO—$(CH_2)_z$—COOH, z being a number from 1 to 20 and it being possible for an H atom of a methylene unit to have been substituted by a $C_1$ to $C_4$ alkyl radical. Examples are ε-caprolactone, β-propiolactone, gamma-butyrolactone and/or methyl-ε-caprolactone, 4-hydroxybenzoic acid, 6-hydroxy-2-naphthoic acid or pivalolactone, and mixtures thereof. Examples of suitable starter components are the low molecular weight dihydric alcohols specified above as a constituent component for the polyester polyols. The corresponding polymers of ε-caprolactone are particularly preferred. Lower polyesterdiols or polyetherdiols as well can be used as starters for preparing the lactone polymers. In lieu of the polymers of lactones it is also possible to use the corresponding, chemically equivalent polycondensates of the hydroxycarboxylic acids corresponding to the lactones.

Particularly suitable here are the cycloaliphatic diols, such as bis(4-hydroxycyclo-hexane)isopropylidene, tetramethylcyclobutanediol, 1,2-, 1,3- or 1,4-cyclohexanediol, 1,1-, 1,2-, 1,3-, and 1,4-cyclohexanedimethanol, cyclooctanediol or norbornanediol.

Compounds (Ac) having more than two isocyanate-reactive groups may be polyols containing preferably 2 to 20 carbon atoms, examples being trimethylolbutane, trimethylolpropane, trimethylolethane, pentaerythritol, glycerol, ditrimethylolpropane, dipentaerythritol, sorbitol, mannitol, diglycerol, threitol, erythritol, adonitol (ribitol), arabitol (lyxitol), xylitol, dulcitol (galactitol), maltitol, isomalt; particular preference is given to trimethylolpropane, pentaerythritol, and glycerol, and very particular preference to trimethylolpropane.

Optional components (Ae) are those with, optionally, at least one compound having precisely one isocyanate-reactive group.

The compounds in question are preferably monools, more preferably alkanols, and very preferably alkanols having 1 to 20, preferably 1 to 12, more preferably 1 to 6, very preferably 1 to 4, and in particular 1 to 2 carbon atoms.

Examples thereof are methanol, ethanol, isopropanol, n-propanol, n-butanol, isobutanol, sec-butanol, tert-butanol, n-hexanol, n-heptanol, n-octanol, n-decanol, n-dodecanol (lauryl alcohol), 2-ethylhexanol, cyclopentanol, cyclohexanol, cyclooctanol, cyclododecanol, ethylene glycol monomethyl ether, ethylene glycol monoethyl ether, diethylene glycol, 1,3-propanediol monomethyl ether, preference being given to methanol, ethanol, isopropanol, n-propanol, n-butanol, tert-butanol, n-hexanol, 2-ethylhexanol, cyclopentanol, cyclohexanol, and cyclododecanol, particular preference to methanol, ethanol, isopropanol, n-propanol, n-butanol, and tert-butanol, very particular preference to methanol and ethanol, and methanol in particular.

In one preferred embodiment the monools may be the stated cycloaliphatic alcohols, preferably cyclopentanol or cyclohexanol, more preferably cyclohexanol.

In another preferred embodiment the monools may be the stated aliphatic alcohols having 6 to 20 carbon atoms, with particular preference those having 8 to 20 carbon atoms, with very particular preference those having 10 to 20 carbon atoms.

In one particularly preferred embodiment the monools are the stated aliphatic alcohols, with very particular preference those with 1 to 4 carbon atoms, especially methanol.

(Ag) The obligatory compounds (Ag) are compounds having at least one isocyanate-reactive group and at least one dispersive group.

Compounds preferred as component (Ag) have at least one, preferably precisely one isocyanate-reactive group and precisely one dispersive group.

The dispersive groups can be preferably (Ag1) anionic groups or groups which can be converted into an anionic group.

Compounds (Ag1) comprise precisely one isocyanate-reactive group, and at least one hydrophilic group which is anionic or can be converted into an anionic group. Examples of the compounds in question are those as described in EP-A1 703 255, particularly from page 3 line 54 to page 4 line 38 therein, in DE-A1 197 24 199, particularly from page 3 line 4 to line 30 therein, in DE-A1 40 10 783, particularly from column 3 line 3 to line 40 therein, in DE-A1 41 13 160, particularly from column 3 line 63 to column 4 line 4 therein, and in EP-A2 548 669, particularly from page 4 line 50 to page 5 line 6 therein. These documents are hereby expressly incorporated by reference as part of the present disclosure content.

Preferred compounds (Ag1) are those having the general formula

in which
RG is at least one isocyanate-reactive group,
DG is at least one dispersive group, and
$R^3$ is an aliphatic, cycloaliphatic or aromatic radical comprising 1 to 20 carbon atoms.

Examples of isocyanate-reactive groups RG are —OH, —SH, —$NH_2$ or —$NHR^5$, wherein $R^5$ has the definition recited above, but can be different than the radical used there; preferably —OH, —$NH_2$ or —$NHR^5$, more preferably —OH or —$NH_2$, and very preferably —OH.

Examples of DG are —COOH, —$SO_3H$ or —POSH and also their anionic forms, with which any desired counterion may be associated, for example, $Li^+$, $Na^+$, $K^+$, $Cs^+$, $Mg^{2+}$, $Ca^{2+}$ or $Ba^{2+}$. As associated counterion it is additionally possible to have quaternary ammonium ions or ammonium ions derived from ammonia or amines, especially tertiary amines, such as, for example, ammonium, methylammonium, dimethylammonium, trimethylammonium, ethylammonium, diethylammonium, triethylammonium, tributylammonium, diisopropylethylammonium, benzyldimethylammonium, monoethanolammonium, diethanolammonium, triethanolammonium, hydroxyethyldimethylammonium, hydroxyethyldiethylammonium, monopropanolammonium, dipropanolammonium, tripropanolammonium, piperidinium, piperazinium, N,N'-dimethylpiperazinium, morpholinium, pyridinium, tetramethylammonium, triethylmethylammonium, 2-hydroxyethyltrimethylammonium, bis(2-hydroxyethyl)dimethylammonium, and tris(2-hydroxyethyl)methylammonium.

$R^3$ is preferably methylene, 1,2-ethylene, 1,2-propylene, 1,3-propylene, 1,2-butylene, 1,4-butylene, 1,3-butylene, 1,6-hexylene, 1,8-octylene, 1,12-dodecylene, 1,2-phenylene, 1,3-phenylene, 1,4-phenylene, 1,2-naphthylene, 1,3-naphthylene, 1,4-naphthylene, 1,6-naphthylene, 1,2-cyclopentylene, 1,3-cyclopentylene, 1,2-cyclohexylene, 1,3-cyclohexylene or 1,4-cyclohexylene.

The component (Ag1) is preferably, for example, hydroxyacetic acid, tartaric acid, lactic acid, 3-hydroxypropionic acid, hydroxypivalic acid, mercaptoacetic acid, mercaptopropionic acid, thiolactic acid, mercaptosuccinic acid, glycine, iminodiacetic acid, sarcosine, alanine, β-alanine, leucine, isoleucine, aminobutyric acid, hydroxysuccinic acid, hydroxydecanoic acid, ethylenediaminetriacetic acid, hydroxydodecanoic acid, hydroxyhexadecanoic acid, 12-hydroxystearic acid, aminonaphthalenecarboxylic acid, hydroxyethanesulfonic acid, hydroxypropanesulfonic acid, mercaptoethanesulfonic acid, mercaptopropanesulfonic acid, aminomethanesulfonic acid, taurine, aminopropanesulfonic acid, N-alkylated or N-cycloalkylated aminopropanesulfonic or aminoethanesulfonic acids, examples being N-cyclohexylaminoethanesulfonic acid or N-cyclohexylaminopropanesulfonic acid, and also their alkali metal, alkaline earth metal or ammonium salts, and with particular preference the stated monohydroxycarboxylic and monohydroxysulfonic acids, and also monoaminocarboxylic and monoaminosulfonic acids.

Additionally preferred compounds (Ag1) are those having precisely one dispersive group DG and at least two isocyanate-reactive groups RG, where, here again, DG denotes —COOH, —$SO_3H$ or —$PO_3H$, and also their anionic forms, with which any desired counterion may be associated, with DG preferably being —COOH groups, and where, here again, the reactive groups RG may be —OH, —SH, —$NH_2$ or —$NHR^5$, in which $R^5$ has the definition recited above, preference being given to —OH, —$NH_2$ or —$NHR^5$, more preference to —OH or —$NH_2$, and with particular preference to —OH.

Examples thereof are dimethylolpropionic acid, dimethylolbutyric acid, trimethylolacetic acid, 3,5-dihydroxybenzoic acid, 2,5-dihydroxybenzoic acid, 3,4-dihydroxybenzoic acid, 2,4-dihydroxybenzoic acid, 2,4-dihydroxy-3,6-dimethylbenzoic acid, sugar acids, 4-amino-2-hydroxybenzoic acid, 5-amino-2-hydroxybenzoic acid, 3,5-diaminobenzoic acid, 1-amino-2-hydroxynaphthalene-4-sulfonic acid, 4,5-dihydroxynaphthalene-2,7-disulfonic acid, 4-amino-5-hydroxynaphthalene-2,7-disulfonic acid, and gallic acid, preference being given to dimethylolpropionic acid, dimethylolbutyric acid, and trimethylolacetic acid, and particular preference to dimethylolpropionic acid.

For preparing the dispersion, the aforementioned acids, if not already in salt form, are fully or partly neutralized, preferably with alkali metal salts or amines, preferably tertiary amines.

In order to achieve good dispersiveness, the polyurethanes of the invention preferably have a density of the molecules carrying the dispersive anionic groups of 1 to 25 mol %, based on a functional group and isocyanate groups, preferably at least 3 mol %, and more preferably from 5 to 15 mol %.

The polyurethanes which can be used in accordance with the invention are obtained by reacting components (Aa), (Ab), and (Ag), and also optionally (Ac) and/or (Ae), with one another.

In this case the molar composition (Aa):(Ab):(Ac):(Ae):(Ag) per mole of reactive isocycanate groups in (Aa) is generally as follows:
(Ab) 1-50, preferably 5-40, more preferably 10-37.5, and more particularly 15-33 mol % of isocyanate-reactive groups,
(Ac) 0-50, preferably 0-30, more preferably 0-25, and more particularly 0-20 mol % of isocyanate-reactive groups,
(Ae) 0-5, preferably 0-4, more preferably 0-3, and more particularly 0-2 mol % of isocyanate-reactive groups,
(Ag) 1-25, preferably 2-20, more preferably 3-15, and more particularly 5-15 mol % of isocyanate-reactive groups,
with the proviso that the sum of the isocyanate-reactive groups corresponds to the number of isocyanate groups in (Aa).

The formation of the adduct of isocyanate-group-containing compound and of the compound which comprises groups that are reactive toward isocyanate groups is generally accomplished by mixing the components in any desired order, optionally at elevated temperature.

It is preferred here to add the compound which comprises groups that are reactive toward isocyanate groups to the compound containing isocyanate groups, preferably in two or more steps.

With particular preference the compound containing isocyanate groups is introduced and the compounds which comprise isocyanate-reactive groups are added. More particularly the compound (Aa) containing isocyanate groups is introduced and subsequently (Ab) and/or (Ag) are/is added. Subsequently it is possible, optionally, to add desired further components.

Generally speaking, the reaction is carried out at temperatures between 5 and 100° C., preferably between 20 to 90° C., and more preferably between 40 and 80° C., and more particularly between 60 and 80° C.

It is preferred to operate under anhydrous conditions during preparation of the polyurethane.

Anhydrous here means that the water content of the reaction system is not more than 5% by weight, preferably not more than 3% by weight, and more preferably not more than 1% by weight; with very particular preference it is not more than 0.75% and in particular not more than 0.5% by weight.

The reaction is carried out preferably in the presence of at least one oxygenous gas, examples being air or air/nitrogen mixtures, or mixtures of oxygen or an oxygenous gas with a gas which is inert under the reaction conditions, having an oxygen content of below 15%, preferably below 12%, more preferably below 10%, very preferably below 8%, and in particular below 6% by volume.

The reaction can also be carried out in the presence of an inert solvent, examples being acetone, isobutyl methyl ketone, toluene, xylene, butyl acetate, methoxypropyl acetate or ethoxyethyl acetate. With preference, however, the reaction is carried out in the absence of a solvent.

In one preferred embodiment the reaction of (Aa) with (Ab) can be carried out under allophanatization conditions.

Typical catalysts for such a reaction are organozinc compounds, such as zinc acetylacetonate or zinc 2-ethylcaproate, or a tetraalkylammonium compound, such as N,N,N-trimethyl-N-2-hydroxypropylammonium hydroxide or such as N,N,N-trimethyl-N-2-hydroxypropylammonium 2-ethylhexanoate, or organotin compounds, such as dibutyltin dilaurate.

Preferred catalysts used are bismuth-, zinc- and/or titanium-containing compounds, preferably a bismuth- and/or titanium-containing compound, and more preferably a bismuth-containing compound.

Zinc and bismuth compounds contemplated are those in which the following anions are used: $F^-$, $Cl^-$, $ClO^-$, $ClO_3^-$, $ClO_4^-$, $Br^-$, $I^-$, $IO_3^-$, $CN^-$, $OCN^-$, $NO_2^-$, $NO_3^-$, $HCO_3^-$, $CO_3^{2-}$, $SH^-$, $HSO_3^-$, $SO_3^{2-}$, $HSO_4^-$, $SO_4^{2-}$, $S_2O_2^{2-}$, $S_2O_4^{2-}$, $S_2O_5^{2-}$, $S_2O_6^{2-}$, $S_2O_7^{2-}$, $S_2O_8^{2-}$, $H_2PO_2^-$, $H_2PO_4^-$, $HPO_4^{2-}$, $PO_4^{3-}$, $P_2O_7^{4-}$, $(OC_nH_{2n+1})^-$, $(C_nH_{2n}O_2)^-$, $(C_nH_{2n-1}O_2)^-$, and $(C_{n+1}H_{2n-2}O_4)^{2-}$, where n stands for the numbers 1 to 20. Preference here is given to the carboxylates in which the anion conforms to the formulae $(C_nH_{2n-1}O_2)^-$ and also $(C_{n+1}H_{2n-2}O_4)^{2-}$ with n being 1 to 20. Particularly preferred salts have monocarboxylate anions of the general formula $(C_nH_{2n-1}O_2)^-$ where n stands for the numbers 1 to 20. Particularly noteworthy in this context are formate, acetate, propionate, hexanoate, neodecanoate, and 2-ethylhexanoate.

Among the zinc catalysts the zinc carboxylates are preferred, more preferably those of carboxylates which have at least six carbon atoms, very preferably at least eight carbon atoms, more particularly zinc(II) diacetate or zinc(II) dioctoate or zinc(II) neodecanoate. Commercial catalysts are, for example, Borchi® Kat 22 from OMG Borchers GmbH, Langenfeld, Germany.

Among the bismuth catalysts the bismuth carboxylates are preferred, more preferably those of carboxylates which have at least six carbon atoms, more particularly bismuth octoates, ethylhexanoates, neodecanoates, or pivalates; examples are K-KAT 348, XC-B221; XC-C227, XC 8203, and XK-601 from King Industries, TIB KAT 716, 716LA, 716XLA, 718, 720, and 789 from TIB Chemicals, and those from Shepherd Lausanne, and also, for example, Borchi® Kat 24; 315; 320 from OMG Borchers GmbH, Langenfeld, Germany.

The catalysts may also comprise mixtures of different metals, as for example in Borchi® Kat 0245 from OMG Borchers GmbH, Langenfeld, Germany.

Among the titanium compounds the titanium tetra-alcoholates $Ti(OR)_4$ are preferred, more preferably those of alcohols ROH having 1 to 8 carbon atoms, examples being methanol, ethanol, isopropanol, n-propanol, n-butanol, isobutanol, sec-butanol, tert-butanol, n-hexanol, n-heptanol, n-octanol; preferably methanol, ethanol, isopropanol, n-propanol, n-butanol, tert-butanol; more preferably isopropanol and n-butanol.

In another preferred embodiment compounds are used of the kind described in WO 00/39183, p. 4, l. 3 to p. 10, l. 19, the disclosure content of which is hereby made part of the present specification. Particular preference among these compounds is given to those having as constituent components at least one (cyclo)aliphatic isocyanate which contains allophanate groups, and at least one hydroxyalkyl(meth)acrylate, very particular preference being given to products 1 to 9 in table 1 on p. 24 of WO 00/39183.

Water-Dispersible Compound (B)

The compound (B) in accordance with the invention has at least two mercapto groups, as for example two to six, preferably two to four, and more preferably three to four.

Mercapto groups are understood in accordance with the invention to be —SH groups, especially those which are bonded to tertiary carbon atoms, methine groups or methylene groups, more preferably those bonded to methylene groups.

Preferred compounds (B) possess a number-average molecular weight $M_n$ of at least 750 g/mol, preferably at least 1000 g/mol, more preferably at least 1250 g/mol, and very preferably at least 1500 g/mol.

In general, a molecular weight $M_n$ of 5000 g/mol ought not to be exceeded, preferably not more than 4500, more preferably not more than 4000, very preferably not more than 3500, and more particularly not more than 3000 g/mol.

Through the indicated molecular weight it is possible to minimize the typical odor of the mercapto compounds.

In one preferred embodiment the compound (B) is a water-dispersible polyurethane containing mercapto groups and synthesized from the following components:
- (Ba) at least one organic aliphatic or cycloaliphatic diisocyanate or polyisocyanate,
- (Bc) optionally at least one compound having at least two isocyanate-reactive groups,
- (Bg) at least one compound which has at least one isocyanate-reactive group and at least one dispersive group,
- (Be) optionally at least one compound having precisely one isocyanate-reactive group, and
- (Bf) at least one compound having at least two mercapto groups.

The compounds (Ba) may in principle be the same compounds as recited above under the compounds (Aa).

In one preferred embodiment the compound (Ba) comprises monomeric diisocyanates, more preferably hexamethylene diisocyanate, 1,3-bis(isocyanatomethyl)cyclohexane, isophorone diisocyanate, and 4,4'- or 2,4'-di(isocyanatocyclohexyl)methane, very preferably isophorone diisocyanate.

The optional compound (Bc) comprises at least one compound having at least two isocyanate-reactive groups, preferably 2 to 6, more preferably 2 to 4, very preferably 2 to 3, and more particularly precisely 2 isocyanate-reactive groups.

This compound may in principle comprise the same compounds as recited above under (Ac).

In one preferred embodiment, the compounds (Bc) are aliphatic or cycloaliphatic diols having 2 to 20 carbon atoms, examples being ethylene glycol, 1,2-propanediol, 1,3-propanediol, 1,1-dimethylethane-1,2-diol, 2-butyl-2-ethyl-1,3-propanediol, 2-ethyl-1,3-propanediol, 2-methyl-1,3-propanediol, neopentyl glycol, neopentyl glycol hydroxypivalate, 1,2-, 1,3- or 1,4-butanediol, 1,6-hexanediol, 1,10-decanediol, bis(4-hydroxycyclohexane)isopropylidene, tetramethylcyclobutanediol, 1,2-, 1,3- or 1,4-cyclohexanediol, cyclooctanediol, norbornanediol, pinanediol, decalindiol, 2-ethyl-1,3-hexanediol, 2,4-diethyloctane-1,3-diol, 2,2-bis(4-hydroxycyclohexyl)propane, 1,1-, 1,2-, 1,3-, and 1,4-cyclohexanedimethanol, 1,2-, 1,3- or 1,4-cyclohexanediol, polyTHF having a molar mass between 162 and 2000, poly-1,2-propanediol or poly-1,3-propanediol having a molar mass between 134 and 1178, or polyethylene glycol having a molar mass between 106 and 2000.

In another preferred embodiment, the compounds (Bc) are polyesterdiols having a number-average molecular weight $M_n$ below 3000 g/mol, preferably below 2500 g/mol, and more preferably below 2000 g/mol.

These polyesterdiols are more preferably reaction products of aliphatic or cycloaliphatic, preferably aliphatic, dicarboxylic acids with aliphatic or cycloaliphatic diols.

Examples of dicarboxylic acids are oxalic acid, succinic acid, glutaric acid, adipic acid, sebacic acid, dodecanedioic acid, azelaic acid, 1,4-cyclohexandicarboxylic acid or tetrahydrophthalic acid, suberic acid, tetrahydrophthalic anhydride, hexahydrophthalic anhydride, endomethylene tetrahydrophthalic anhydride, glutaric anhydride, and also esterifiable derivatives, such as anhydrides or dialkyl esters, $C_1$-$C_4$-alkyl esters for example, preferably methyl, ethyl or n-butyl esters, of the stated acids are used. Preference is given to dicarboxylic acids of the general formula HOOC—$(CH_2)_y$—COOH, y being a number from 1 to 20, preferably an even number from 2 to 20; more preferably succinic acid, adipic acid, sebacic acid, and dodecanedicarboxylic acid.

Examples of diols are ethylene glycol, 1,2-propanediol, 1,3-propanediol, 1,1-dimethylethane-1,2-diol, 2-butyl-2-ethyl-1,3-propanediol, 2-ethyl-1,3-propanediol, 2-methyl-1,3-propanediol, neopentyl glycol, neopentyl glycol hydroxypivalate, 1,2-, 1,3- or 1,4-butanediol, 1,6-hexanediol, 1,10-decanediol, bis(4-hydroxycyclohexane)isopropylidene, tetramethylcyclobutanediol, 1,2-, 1,3- or 1,4-cyclohexanediol, cyclooctanediol, norbornanediol, pinanediol, decalindiol, 2-ethyl-1,3-hexanediol, 2,4-diethyloctane-1,3-diol, 2,2-bis(4-hydroxycyclohexyl)propane, 1,1-, 1,2-, 1,3-, and 1,4-cyclohexanedimethanol, and 1,2-, 1,3- or 1,4-cyclohexanediol.

The at least one compound (Bg) having at least one isocyanate-reactive group and at least one dispersive group may in principle involve the same groups as recited above under (Ag), preferably as recited under (Ag1).

In addition to the compounds recited under (Ag1), the compound (Bg) may also comprise those compounds which have more than one isocyanate-reactive group and precisely one group DG.

Examples of the latter are dimethylolpropionic acid, dimethylolbutyric acid, and trimethylolacetic acid, preferably dimethylolpropionic acid and dimethylolbutyric acid, and more preferably dimethylolpropionic acid.

Preferred compounds (Bg) are hydroxyacetic acid, lactic acid, 3-hydroxypropionic acid, hydroxypivalic acid, mercaptoacetic acid, mercaptopropionic acid, glycine, iminodiacetic acid, sarcosine, alanine, β-alanine, hydroxyethanesulfonic acid, hydroxypropanesulfonic acid, taurine, aminopropanesulfonic acid, N-alkylated or N-cycloalkylated aminopropanesulfonic or aminoethanesulfonic acids, examples being N-cyclohexylaminoethanesulfonic acid or N-cyclohexylaminopropanesulfonic acid, and also dimethylolpropionic acid.

With particular preference the compound (Bg) is selected from the group consisting of dimethylolpropionic acid, hydroxypivalic acid, glycolic acid, and thioglycolic acid.

The optional at least one compound (Be) having precisely one isocyanate-reactive group may in principle comprise the same compounds as recited above under (Ae).

The compound (Be) preferably comprises alkanols having 1 to 20, preferably 1 to 12, more preferably 1 to 6, very preferably 1 to 4, and more particularly 1 to 2 carbon atoms.

The compounds in question are more preferably methanol, ethanol, isopropanol, n-propanol, n-butanol, iso-butanol, sec-butanol and tert-butanol, very preferably methanol, ethanol or n-butanol, and more particularly methanol.

The at least one compound (Bf) comprises compounds having at least two, for example two to six, preferably two to five, more preferably two to four mercapto groups.

Conceivable are compounds (Bf) having at least one, preferably precisely one hydroxyl or primary or secondary amino group and at least two mercapto groups.

Preference, however, is given to compounds (Bf) which contain exclusively mercapto groups as reactive groups.

Examples of compounds of this kind are di-, tri-, and poly-mercaptoalkanes.

In one preferred embodiment, the compounds (Bf) are reaction products of alcohols having the corresponding desired functionality with 2-mercaptoacetic acid or 3-mercaptopropionic acid and/or derivatives thereof.

In order to obtain dimercaptans, therefore, diols are used accordingly; for trimercaptans, triols, and so on.

Examples of alcohols of this kind with corresponding functionality are recited under the compounds (Ac).

Preferably these alcohols are 1,2-propanediol, ethylene glycol, 2,2-dimethyl-1,2-ethanediol, 1,3-propanediol, 1,2-butanediol, 1,3-butanediol, 1,4-butanediol, 3-methylpentane-1,5-diol, 2-ethylhexane-1,3-diol, 2,4-diethyloctane-1,3-diol, 1,6-hexanediol, polyTHF having a molar mass between 162 and 2000, poly-1,3-propanediol having a molar mass between 134 and 1178, poly-1,2-propanediol having a molar mass between 134 and 898, polyethylene glycol having a molar mass between 106 and 458, neopentyl glycol, neopentyl glycol hydroxypivalate, 2-ethyl-1,3-propanediol, 2-methyl-1,3-propanediol, 2,2-bis(4-hydroxycyclohexyl)propane, 1,1-, 1,2-, 1,3-, and 1,4-cyclohexanedimethanol, 1,2-, 1,3- or 1,4-cyclohexanediol, trimethylolbutane, trimethylolpropane, trimethylolethane, neopentyl glycol, pentaerythritol, glycerol, ditrimethylolpropane, dipentaerythritol, sorbitol, mannitol, diglycerol, threitol, erythritol, adonitol (ribitol), arabitol (lyxitol), xylitol, dulcitol (galactitol), maltitol or isomalt, which if appropriate may have been alkoxylated as described above.

In one particularly preferred embodiment the compounds (Bf) are compounds of the formula

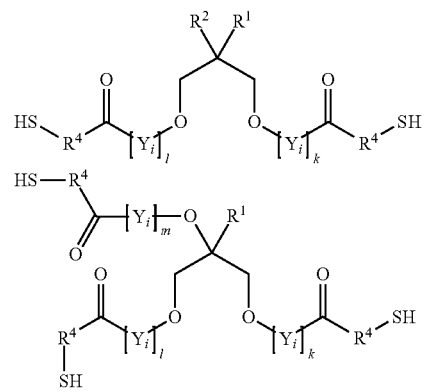

-continued

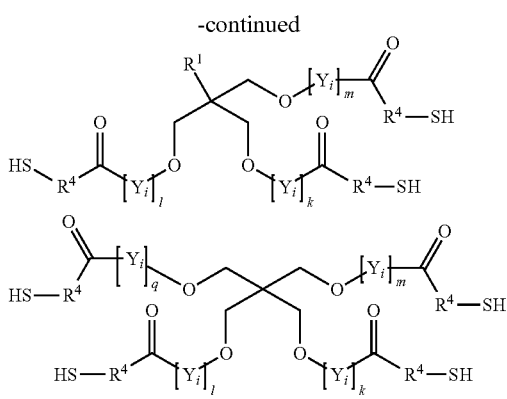

in which

R¹, R² each independently of one another are hydrogen or a C₁- to C₄ alkyl radical, R⁴ is methylene or 1,2-ethylene, k, l, m, and q, in each case independently of one another, are zero or a positive integer from 1 to 5, preferably zero or a positive integer from 1 to 4, and more preferably zero or a positive integer from 1 to 3, each $Y_i$ for i=1 to k, 1 to l, 1 to m, and 1 to q may be selected independently of one another from the group consisting of —CH₂—CH₂—O—, —CH₂—CH(CH₃)—O—, —CH(CH₃)—CH₂—O—, —CH₂—C(CH₃)₂—O—, —C(CH₃)₂—CH₂—O—, —CH₂—CHVin-O—, —CHVin-CH₂—O—, —CH₂—CHPh-O—, and —CHPh-CH₂—O—, preferably from the group of —CH₂—CH₂—O—, —CH₂—CH(CH₃)—O—, and —CH(CH₃)—CH₂—O—, and more preferably —CH₂—CH₂—O—, where Ph is phenyl and Vin is vinyl.

Especially preferred are compounds (Bf) selected from the group consisting of pentaerythritol tetra(3-mercaptopropionate) (PETMP), ethylene glycol di(3-mercaptopropionate) (GDMP), trimethylolpropane tri(3-mercaptopropionate) (TMPMP), trimethylolpropane trimercaptoacetate (TMPMA), pentaerythritol tetramercaptoacetate (PETMA), 3-mercaptopropionic esters of poly-1,2-propylene glycol with a molar mass of 500 to 2500 g/mol or 3-mercaptopropionic esters of ethoxylated trimethylpropane with a molar mass of up to 1500 g/mol.

The polyurethanes (B) are prepared in the same way as the polyurethanes (A). For preparing the dispersion, if not already in salt form, the acid groups in the polyurethanes (B) may be wholly or partly neutralized, preferably with alkali metal salts, ammonia or amines, preferably tertiary amines.

For preparing the dispersions of the invention, the polyurethanes (A) and (B) are prepared either separately from one another as aqueous dispersions, after which these aqueous dispersions are mixed with one another, or one of the polyurethanes, (A) or (B), is prepared as an aqueous dispersion and the other is mixed into this resultant aqueous dispersion.

In the process known as the prepolymer mixing process a prepolymer is first prepared from components (Aa) to (Ag) or (Ba) to (Bf). If necessary, this prepolymer can be prepared in a water-miscible solvent which boils below 100° C. under atmospheric pressure, preferably acetone, ethyl methyl ketone or diethyl ketone. The prepolymer is first dispersed in water and if appropriate, simultaneously and/or subsequently, is crosslinked by reaction of the isocyanate groups with amines which carry more than 2 isocyanate-reactive amino groups, or is chain-extended with amines which carry 2 isocyanate-reactive amino groups. Chain extension also takes place when no amine is added. In that case, excess isocyanate groups are hydrolyzed to amine groups, which are consumed by reaction with remaining isocyanate groups of the prepolymers, in a reaction accompanied by chain extension.

The average particle size (z-average), measured by means of dynamic light scattering using the Malvern® Autosizer 2 C, of the dispersions prepared in accordance with the invention is generally <200 nm, preferably <150 nm and more preferably <100 nm.

The dispersions generally have a solids content of 10% to 75%, preferably of 20% to 65% by weight and a viscosity of 10 to 500 mPas (measured at a temperature of 20° C. and a shear rate of 250 s⁻¹).

For certain applications it can be sensible to adjust the dispersions to a different solids content, preferably to a lower solids content, by means for example of dilution.

The aqueous dispersions of polyurethanes of the invention can be used for coating a variety of substrates, such as wood, wood veneer, paper, paperboard, cardboard, textile, leather, nonwoven, plastics surfaces, glass, ceramic, mineral building materials, and coated or uncoated metals.

In the case of use in coating materials, the polyurethanes of the invention can be employed in particular in primers, primer-surfacers, pigmented topcoat materials, and clearcoat materials in the fields of automotive refinish or the finishing of large vehicles. Coating materials of this kind are particularly suitable for applications requiring a particularly high level of reliability in application, external weathering resistance, optical qualities, resistance to solvents, chemicals, and water, as in automotive refinish and the finishing of large vehicles.

The coating compositions of the invention are suitable for coating substrates such as wood, paper, textile, leather, nonwoven, plastics surfaces, glass, ceramic, mineral building materials, such as cement moldings and fiber-cement slabs, or coated or uncoated metals, preferably plastics or metals, particularly in the form of thin sheets, and with particular preference metals.

The coating compositions of the invention are suitable as or in exterior coatings, in other words in those applications involving exposure to daylight, preferably parts of buildings, interior coatings, and coatings on vehicles and aircraft. In particular the coating compositions of the invention are used as or in automotive clearcoat and topcoat material(s). Further preferred fields of use are can coating and coil coating.

In particular they are suitable as primers, surfacers, pigmented topcoat materials, and clearcoat materials in the sectors of industrial coating, wood coating, automotive finishing, especially OEM finishing, or decorative coating. The coating materials are especially suitable for applications requiring a particularly high level of reliability in application, outdoor weathering resistance, optical qualities, scratch resistance, solvent resistance and/or chemical resistance. The radiation-curable coating compositions may optionally further comprise at least one photoinitiator and/or, optionally, further typical coatings additives.

Photoinitiators may be, for example, photoinitiators known to the skilled worker, examples being those specified in "Advances in Polymer Science", Volume 14, Springer Berlin 1974 or in K. K. Dietliker, Chemistry and Technology of UV and EB Formulation for Coatings, Inks and Paints, Volume 3; Photoinitiators for Free Radical and Cationic Polymerization, P. K. T. Oldring (Eds), SITA Technology Ltd, London.

Suitability is possessed, for example, by mono- or bisacylphosphine oxides, as described for example in EP-A 7 508, EP-A 57 474, DE-A 196 18 720, EP-A 495 751 or EP-A 615

980, examples being 2,4,6-trimethylbenzoyldiphenylphosphine oxide (Lucirin® TPO from BASF AG), ethyl 2,4,6-trimethylbenzoylphenylphosphinate (Lucirin® TPO L from BASF AG), bis(2,4,6-trimethylbenzoyl)phenylphosphine oxide (Irgacure® 819 from Ciba Spezialitätenchemie), benzophenones, hydroxyacetophenones, phenylglyoxylic acid and its derivatives, or mixtures of these photoinitiators. Examples that may be mentioned include benzophenone, acetophenone, acetonaphthoquinone, methyl ethyl ketone, valerophenone, hexanophenone, α-phenylbutyrophenone, p-morpholinopropiophenone, dibenzosuberone, 4-morpholinobenzophenone, 4-morpholinodeoxybenzoin, p-diacetylbenzene, 4-aminobenzophenone, 4'-methoxyacetophenone, β-methylanthraquinone, tert-butylanthraquinone, anthraquinonecarboxylic esters, benzaldehyde, α-tetralone, 9-acetylphenanthrene, 2-acetylphenanthrene, 10-thioxanthenone, 3-acetylphenanthrene, 3-acetylindole, 9-fluorenone, 1-indanone, 1,3,4-triacetylbenzene, thioxanthen-9-one, xanthen-9-one, 2,4-dimethylthioxanthone, 2,4-diethylthioxanthone, 2,4-diisopropylthioxanthone, 2,4-dichlorothioxanthone, benzoin, benzoin isobutyl ether, chloroxanthenone, benzoin tetrahydropyranyl ether, benzoin methyl ether, benzoin ethyl ether, benzoin butyl ether, benzoin isopropyl ether, 7H-benzoin methyl ether, benz[de]anthracene-7-one, 1-naphthaldehyde, 4,4'-bis(dimethylamino) benzophenone, 4-phenylbenzophenone, 4-chlorobenzophenone, Michler's ketone, 1-acetonaphthone, 2-acetonaphthone, 1-benzoylcyclohexan-1-ol, 2-hydroxy-2,2-dimethylacetophenone, 2,2-dimethoxy-2-phenylacetophenone, 2,2-diethoxy-2-phenylacetophenone, 1,1-dichloroacetophenone, 1-hydroxyacetophenone, acetophenone dimethyl ketal, o-methoxybenzophenone, triphenylphosphine, tri-o-tolylphosphine, benz[a]anthracene-7,12-dione, 2,2-diethoxyacetophenone, benzil ketals, such as benzil dimethyl ketal, 2-methyl-1-[4-(methylthio)phenyl]-2-morpholinopropan-1-one, anthraquinones such as 2-methylanthraquinone, 2-ethylanthraquinone, 2-tert-butylanthraquinone, 1-chloroanthraquinone, and 2-amylanthraquinone, 2,3-butanedione.

Also suitable are nonyellowing or low-yellowing photoinitiators of the phenylglyoxalic ester type, as described in DE-A 198 26 712, DE-A 199 13 353 or WO 98/33761.

Preference among these photoinitiators is given to 2,4,6-trimethylbenzoyldiphenylphosphine oxide, ethyl 2,4,6-trimethylbenzoylphenylphosphinate, bis(2,4,6-trimethyl-benzoyl)phenylphosphine oxide, benzophenone, 1-benzoylcyclohexan-1-ol, 2-hydroxy-2,2-dimethylacetophenone, and 2,2-dimethoxy-2-phenylacetophenone.

As further typical coatings additives it is possible for example to use antioxidants, stabilizers, activators (accelerants), fillers, pigments, dyes, antistats, flame retardants, thickeners, thixotropic agents, surface-active agents, viscosity modifiers, plasticizers or chelating agents.

It is additionally possible to add one or more thermally activatable initiators, e.g., potassium peroxodisulfate, dibenzoyl peroxide, cyclohexanone peroxide, di-tert-butyl peroxide, azobisisobutyronitrile, cyclohexylsulfonyl acetyl peroxide, diisopropyl percarbonate, tert-butyl peroctoate or benzpinacol, and, for example, those thermally activatable initiators which have a half-life of more than 100 hours at 80° C., such as di-tert-butyl peroxide, cumene hydroperoxide, dicumyl peroxide, tert-butyl perbenzoate, silylated pinacols, which are available commercially, for example, under the trade name ADDID 600 from Wacker, or hydroxyl-containing amine N-oxides, such as 2,2,6,6-tetramethylpiperidine-N-oxyl, 4-hydroxy-2,2,6,6-tetramethylpiperidine-N-oxyl, etc.

Other examples of suitable initiators are described in "Polymer Handbook", 2nd ed., Wiley & Sons, New York.

Suitable thickeners include not only free-radically (co)polymerized (co)polymers but also customary organic and inorganic thickeners such as hydroxymethylcellulose or bentonite.

As chelating agents it is possible, for example, to use ethylenediamineacetic acid and its salts, and also β-diketones.

Suitable fillers comprise silicates, examples being silicates obtainable by hydrolysis of silicon tetrachloride, such as Aerosil® from Degussa, siliceous earth, talc, aluminum silicates, magnesium silicates, calcium carbonates, etc.

Suitable stabilizers comprise typical UV absorbers such as oxanilides, triazines, and benzotriazole (the latter obtainable as Tinuvin® grades from Ciba-Spezialitätenchemie), and benzophenones. They can be employed alone or together with suitable free-radical scavengers, examples being sterically hindered amines such as 2,2,6,6-tetramethylpiperidine, 2,6-di-tert-butylpiperidine or derivatives thereof, e.g., bis(2,2,6,6-tetramethyl-4-piperidyl)sebacate. Stabilizers are used usually in amounts of 0.1% to 5.0% by weight, based on the solid components comprised in the preparation.

One advantage of the present invention is that the coating compositions of viscosity must not necessarily comprise a solvent, examples being butyl acetate, ethyl acetate, methoxypropyl acetate, toluene, xylene, fluorinated aromatics, and aliphatic and aromatic hydrocarbon mixtures.

Preference is therefore given in accordance with the invention to those coating compositions which are substantially free from organic solvents.

Coating of the substrates with the coating compositions of the invention takes place in accordance with customary methods which are known to the skilled worker and involve applying a coating composition of the invention, or a coating formulation comprising it, to the target substrate in the desired thickness, and, if appropriate, drying it. This operation may if desired be repeated one or more times. Application to the substrate may take place in a known way, such as for example by spraying, troweling, knifecoating, brushing, rolling, roller coating, pouring, laminating, injection-backmolding or coextruding.

The coating thickness is generally in a range from about 3 to 1000 g/m$^2$ and preferably 10 to 200 g/m$^2$.

Additionally disclosed is a method of coating substrates which involves adding, if appropriate, further, typical coatings additives and thermally curable, chemically curable or radiation-curable resins to a coating composition of the invention or to a coating formulation comprising it, applying the resulting formulation to the substrate, drying it if appropriate, and curing it with electron beams or by UV exposure under an oxygen-containing atmosphere or, preferably, under inert gas, with thermal treatment if appropriate at temperatures up to the level of the drying temperature, and subsequently at temperatures up to 160° C., preferably between 60 and 160° C., more preferably between 100 and 160° C.

Radiation curing takes place with high-energy light, UV light for example, or electron beams. Radiation curing may take place at relatively high temperatures. Preference is given in this case to a temperature above the $T_9$ of the radiation-curable binder.

The coating materials may be applied one or more times by a very wide variety of spraying methods, such as compressed-air, airless or electrostatic spraying methods, using one- or two-component spraying units, or else by injecting, troweling, knifecoating, brushing, rolling, roller coating, pouring, laminating, injection-backmolding or coextruding.

Drying and curing of the coatings takes place in general under standard temperature conditions, i.e., without the coating being heated. Alternatively the mixtures of the invention can be used to produce coatings which, following application, are dried and cured at an elevated temperature, e.g., at 40-250° C., preferably 40-150° C., and in particular at 40 to 100° C. This is limited by the thermal stability of the substrate.

Additionally disclosed is a method of coating substrates which involves adding, if appropriate, thermally curable resins to the coating composition of the invention or coating formulations comprising it, applying the resulting formulation to the substrate, drying it, and then curing it with electron beams or UV exposure under an oxygen-containing atmosphere or, preferably, under inert gas, if appropriate at temperatures up to the level of the drying temperature.

The method of coating substrates can also be practiced by irradiating the applied coating composition of the invention or coating formulations of the invention first with electron beams or by UV exposure under oxygen or, preferably, under inert gas, in order to obtain preliminary curing, then carrying out thermal treatment at temperatures up to 160° C., preferably between 60 and 160° C., and subsequently completing curing with electron beams or by UV exposure under oxygen or, preferably, under inert gas.

If appropriate, if a plurality of layers of the coating material are applied one on top of another, drying and/or radiation curing may take place after each coating operation.

Examples of suitable radiation sources for the radiation cure are low-pressure mercury lamps, medium-pressure mercury lamps with high-pressure lamps, and fluorescent tubes, pulsed lamps, metal halide lamps, electronic flash units, with the result that radiation curing is possible without a photoinitiator, or excimer lamps. The radiation cure is accomplished by exposure to high-energy radiation, i.e., UV radiation, or daylight, preferably light in the wavelength range of $\lambda=200$ to 700 nm, more preferably $\lambda=200$ to 500 nm, and very preferably $\lambda=250$ to 400 nm, or by exposure to high-energy electrons (electron beams; 150 to 300 keV). Examples of radiation sources used include high-pressure mercury vapor lamps, lasers, pulsed lamps (flash light), LED lamps, halogen lamps or excimer lamps. The radiation dose normally sufficient for crosslinking in the case of UV curing is in the range from 80 to 3000 mJ/cm$^2$.

It will be appreciated that a number of radiation sources can also be used for the cure: two to four, for example.

These sources may also emit each in different wavelength ranges.

Drying and/or thermal treatment may also take place, in addition to or instead of the thermal treatment, by means of NIR radiation, which here refers to electromagnetic radiation in the wavelength range from 760 nm to 2.5 μm, preferably from 900 to 1500 nm.

Irradiation can if appropriate also be carried out in the absence of oxygen, such as under an inert gas atmosphere. Suitable inert gases are preferably nitrogen, noble gases, carbon dioxide, or combustion gases. Furthermore, irradiation may take place by covering the coating composition with transparent media. Examples of transparent media include polymeric films, glass or liquids, water for example. Particular preference is given to irradiation in the manner described in DE-A1 199 57 900.

ppm and percentage figures used in this specification are by weight unless otherwise indicated.

The examples below are intended to illustrate the invention but not to limit it to these examples.

EXAMPLES

Example 1

Preparing an Inventive Thiol Dispersion

In a stirred vessel, 33.3 parts of isophorone diisocyanate, 13.4 parts of dimethylolpropionic acid, 30 parts of acetone, and 0.5 part of dibutyltin dilaurate were mixed at room temperature and then heated to reflux. The dimethylolpropionic acid slowly dissolved, and after about 3 hours the batch became highly viscous. After a reaction time of 4 hours, it was cooled to room temperature, and 48.8 parts of pentaerythritol tetrakis(3-mercaptopropionate) and 20 parts of acetone were added. The mixture was then left to react at 60° C. for another 4 hours. The NCO value fell to 0.

At 50° C., the reaction mixture was neutralized with 10 parts of triethylamine and over the course of 30 minutes 140 parts of water were added. The acetone was thereafter removed by vacuum distillation. The dispersion had a solids content of 48%, and the particle size of the translucent dispersion was smaller than 20 nm.

Example 2

Preparing an Inventive Thiol Dispersion

In a stirred vessel, 33.3 parts of isophorone diisocyanate, 6.7 parts of dimethylolpropionic acid, 7.2 parts of cyclohexanedimethanol, 30 parts of acetone, and 0.5 part of dibutyltin dilaurate were mixed at room temperature and then heated to reflux. The dimethylolpropionic acid slowly dissolved, and after about 3 hours the batch became highly viscous. After a reaction time of 4 hours, it was cooled to room temperature, and 48.8 parts of pentaerythritol tetrakis(3-mercaptopropionate) and 20 parts of acetone were added.

The mixture was then left to react at 60° C. for another 4 hours. The NCO value fell to 0. At 50° C., the reaction mixture was neutralized with 5 parts of triethylamine and over the course of 30 minutes 190 parts of water were added. The acetone was thereafter removed by vacuum distillation. The dispersion had a solids content of 41%, and the particle size of the translucent dispersion was smaller than 20 nm.

Example 3

Mixtures were produced from the parts indicated in the table of a radiation-curable, commercially available dispersion (Laromer® UA 9064, BASF SE, water-based dispersion of a urethane acrylate, solid content about 38% by weight, average particle size <150 nm), from the stated parts of the thiol dispersion from example 1, and from 2 parts in each case, based on the solids, of the photoinitiator Irgacure® 500:

| No. | Parts of Laromer ® UA 9064 | Parts of example 1 dispersion |
|-----|---------------------------|-------------------------------|
| 3a  | 100                       | —                             |
| 3b  | 100                       | 8                             |
| 3c  | 100                       | 20                            |
| 3d  | 100                       | 40                            |
| 3e  | —                         | 100                           |

Performance Testing

Dispersions 3a to 3e are drawn down onto 3 glass plates per series, using a four-way bar applicator with a spot width of 250 μm.

One glass plate each was dried at room temperature for 30 minutes and then in a drying cabinet at 60° C. for 20 minutes. After that it was exposed in an IST exposure unit with 1350 mJ/cm² under an air atmosphere.

One glass plate each was dried at room temperature for 30 minutes and then in a drying cabinet at 60° C. for 20 minutes. After that it was exposed in an IST exposure unit with 1350 mJ/cm² under a nitrogen atmosphere.

One glass plate each was stored at room temperature.

After exposure or after storage (1 day, 2 days, 5 days), the hardness was measured by means of the König pendulum hardness in accordance with DIN 53157, in seconds. High values denote high hardness.

| No. | UV exposure | | Storage without exposure | | |
|---|---|---|---|---|---|
| | Air | Nitrogen | 1 day | 2 days | 5 days |
| | Pendulum damping (s) | | | | |
| 3a | 161 | 169 | 14 | 20 | 21 |
| 3b | 172 | 172 | 20 | 29 | 32 |
| 3c | 176 | 176 | 36 | 57 | 64 |
| 3d | 172 | 172 | 80 | 120 | 137 |
| 3e | 38 | 38 | 34 | 50 | 66 |

The results show that the dispersions based on the combination of UV-curable dispersions and thiol-terminated dispersions, in the case of UV exposure, suffer virtually no inhibition by oxygen, and exhibit a slight increase in the pendulum hardness, and display a significant increase in pendulum hardness with storage time especially when stored purely at room temperature.

The pure mixtures of dispersions 3b-3d are still stable after 5 days of storage.

Comparative Example 1

A mixture was prepared from 10 parts of Laromer UA 9064 and 10 parts of the water-soluble triple 3-mercaptopropionic ester of ethoxylated trimethylpropane with a molar mass of 1300 (Bruno Bock GmbH). Even without the addition of photoinitiator, the mixture gelled after 2 hours.

The invention claimed is:

1. An aqueous dispersion, comprising:
   (A) a water-dispersible, radiation-curable polyurethane (A) comprising in polymerized form
      (Aa) an organic aliphatic, aromatic, or cycloaliphatic diisocyanate or polyisocyanate,
      (Ab) a compound having at least one isocyanate-reactive group and at least one free-radically polymerizable unsaturated group,
      (Ac) optionally a compound having at least two isocyanate-reactive groups,
      (Ae) optionally a compound having one isocyanate-reactive group,
      (Ag) a compound having at least one isocyanate-reactive group and at least one dispersive group; and
   (B) a water-dispersible compound (B) comprising at least two mercapto groups, wherein
      (Ab) contains 1 to 50 mol % of isocyanate-reactive groups,
      (Ac) contains 0 to 50 mol % of isocyanate-reactive groups,
      (Ae) contains 0 to 5 mol % of isocyanate-reactive groups, and
      (Ag) contains 1 to 25 mol % of isocyanate-reactive groups, based on one mole of the isocyanate groups,
   with the proviso that a sum of the isocyanate-reactive groups in (Aa), (Ab), (Ae) and (Ag) equals to a sum of the isocyanate groups in (Aa).

2. The aqueous dispersion according to claim 1, comprising, as the component (Aa), monomers or oligomers of aliphatic or cycloaliphatic diisocyanates.

3. The aqueous dispersion according to claim 1, wherein the component (Ag) comprises as dispersive groups anionic groups and/or groups convertible to an anionic group.

4. The aqueous dispersion according to claim 1, wherein the mercapto groups of the compound (B) are —SH groups which are bonded to methylene groups.

5. The aqueous dispersion according to claim 1, wherein a number-average molecular weight $M_n$ of the compound (B) is at least 750 g/mol.

6. The aqueous dispersion according to claim 1, wherein the compound (B) is a water-dispersible polyurethane comprising mercapto groups that is synthesized from the following components:
   (Ba) an organic aliphatic or cycloaliphatic diisocyanate or polyisocyanate,
   (Bc) optionally a compound comprising at least two isocyanate-reactive groups,
   (Bg) a compound comprising at least one isocyanate-reactive group and at least one dispersive group,
   (Be) optionally a compound comprising one isocyanate-reactive group, and
   (Bf) a compound comprising at least two mercapto groups.

7. The aqueous dispersion according to claim 6, wherein the compound (Ba) is selected from the group consisting of hexamethylene diisocyanate, 1,3-bis(isocyanato-methyl)cyclohexane, isophorone diisocyanate, 4,4'-di(isocyanatocyclohexyl)-methane and 2,4'-di(isocyanatocyclohexyl)methane.

8. The aqueous dispersion according to claim 6, wherein the compound (Bf) comprises reaction products of alcohols with 2-mercaptoacetic acid or 3-mercaptopropionic acid and/or derivatives thereof.

9. The aqueous dispersion according to claim 6, wherein the compound (Bf) has the formula

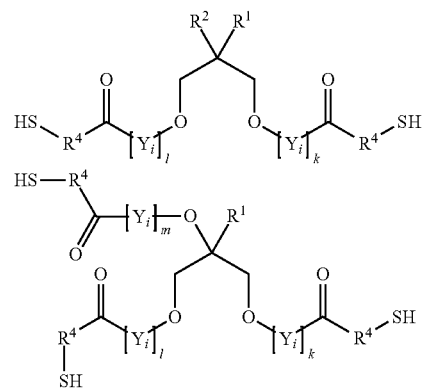

-continued

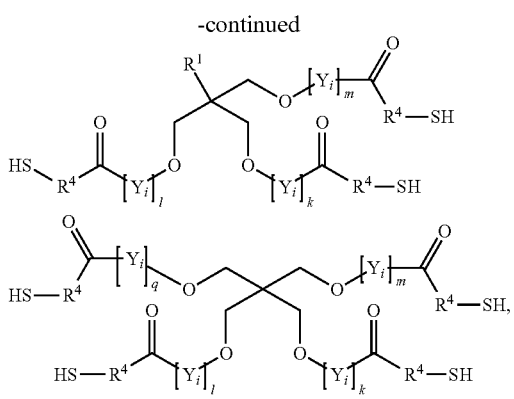

wherein:

$R^1, R^2$ each independently represented hydrogen or a $C_1$- to $C_4$ alkyl radical;

$R^4$ represents methylene or 1,2-ethylene; and k, l, m, and q, in each case independently represent zero or a positive integer from 1 to 5, such that each $Y_i$ for i=1 to k, 1 to l, 1 to m, and 1 to q is independently selected from the group consisting of —$CH_2$—$CH_2$—O—, —$CH_2$—$CH(CH_3)$—O—, —$CH(CH_3)$—$CH_2$—O—, —$CH_2$—$C(CH_3)_2$—O—, —$C(CH_3)_2$—$CH_2$—O—, —$CH_2$—CHVin-O—, —CHVin-$CH_2$—O—, —$CH_2$—CHPh-O—, and —CHPh-$CH_2$—O—, where Ph is phenyl and Vin is vinyl.

10. A process for preparing the aqueous dispersion according to claim 1, the process comprising mixing aqueous dispersions of the component (A) and the component (B) with one another.

11. A process for coating an article, the process comprising coating an article with the aqueous dispersion of claim 1, said article selection from the group consisting of wood, wood veneer, paper, paperboard, cardboard, textile, leather, nonwoven, a plastic surface, glass, ceramic, mineral building materials, and coated or uncoated metals.

12. The aqueous dispersion according to claim 9, wherein k, l, m, and q, in each case independently represent zero or a positive integer from 1 to 4.

13. The aqueous dispersion according to claim 9, wherein each $Y_i$ for i=1 to k, 1 to l, 1 to m, and 1 to q is independently selected from the group consisting of —CH2-CH2-O—, —CH2-CH(CH3)-O—, and —CH(CH3)-CH2-O—.

14. The aqueous dispersion according to claim 1,
wherein
(Ab) contains 5 to 40 mol % of isocyanate-reactive groups,
(Ac) contains 0 to 30 mol % of isocyanate-reactive groups,
(Ae) contains 0 to 4 mol % of isocyanate-reactive groups, and
(Ag) contains 2 to 20 mol % of isocyanate-reactive groups,
based on one mole of the isocyanate groups,
with the proviso that a sum of the isocyanate-reactive groups in (Aa), (Ab), (Ae) and (Ag) equals to a sum of the isocyanate groups in (Aa).

* * * * *